Patented Feb. 18, 1930

1,747,806

UNITED STATES PATENT OFFICE

VANDERVEER VOORHEES, OF WHITING, INDIANA, ASSIGNOR TO STANDARD OIL COMPANY, OF WHITING, INDIANA, A CORPORATION OF INDIANA

DECOLORIZING AND COLOR-STABILIZING HYDROCARBON OIL

No Drawing. Application filed October 31, 1927. Serial No. 230,192.

This invention relates to decolorizing and color stabilizing hydrocarbon oils and particularly the lower boiling distillate fractions thereof, such as gasoline.

More specifically, the invention relates to an improvement in the vapor phase treatment of such distillates with clay or other adsorbent materials. In practice, it is found that such treatment gives a limited amount of distillate of good color stability on a basis of clay used.

The present invention is based upon the discovery that if the vapor phase clayed distillate is treated with dilute sulfuric acid, that is, sulfuric acid of such dilution that it exerts no discoloring effect on the oil, and causes no appreciable sludging action or loss of the oil, the clay can be used to produce much larger yields of distillate of satisfactory color and color stability.

The strength of the acid may suitably be below 70% and may be as dilute as 10%. Ordinarily, it is preferred to employ sulfuric acid of a concentration of about 50%.

The invention will be fully understood from the following detailed example.

Rectified vapors from a continuous pressure still are passed at 280° F. and atmospheric pressure through 10 pounds of Olmstead clay and condensed. Samples of the condensate are taken at times corresponding to yields of 650, 1460, and 5320 barrels per ton of clay. One portion of the last sample is treated with 50% sulfuric acid in the proportion of 10 cc. per liter of oil. All the samples are treated with doctor solution. Color measurements (Saybolt) are taken on the fresh oils and again after the oils have been stored for three and a half months in tightly stoppered bottles in the dark. The color measurements are as follows:

| Sample | 650 barrel yield | 1460 barrel yield | 5320 barrel yield | |
|---|---|---|---|---|
| | | | Untreated | Acid treated |
| Initial color | 28 | 30 | 30 | 30 |
| Color after storage | 25 | 21 | 21 | 26 |

A final color of 25 or 26 under these conditions is satisfactory but 21 is unsatisfactory.

From these tests it appears that only about 1000 to 1500 barrels of oil of satisfactory color stability are produced by the vapor claying operation and that 3 to 5 times as much oil of satisfactory color and color stability can be produced with the same amount of clay, when the clayed oil is treated with dilute acid.

While it is preferred to use sulfuric acid, other acids may be used.

The acid treatment may be applied to all the clayed oil, if desired. Since, however, the first part of the clayed oil is of satisfactory color stability without further treatment, it may be collected separately, and the acid treatment may be applied only to the later oil of unsatisfactory color stability.

Although the present invention has been described in connection with the details of a specific example thereof, it is not intended that such details shall be regarded as limitations upon the scope of the invention, except in so far as included in the accompanying claims.

I claim:

1. The method of decolorizing and color stabilizing hydrocarbon oils which consists in passing them in vapor form through adsorbent material, condensing the vapors and treating the oil with dilute sulfuric acid of a concentration below 70%.

2. The method of decolorizing and color stabilizing petroleum distillates which consists in passing the distillate in the form of vapors through fuller's earth, condensing the clayed vapors and treating the condensate with dilute sulfuric acid of a concentration below 70%.

3. The method of color stabilizing petroleum distillates which consists in passing the distillate vapors through clay to an extent beyond the maximum yield of oil of satisfactory color stability, and treating such oil with sulfuric acid of a concentration below 70%.

4. The method of color stabilizing petroleum distillates which consists in passing the distillate vapors through clay to an extent beyond the maximum yield of oil of satisfactory color stability, and treating such oil with sulfuric acid of a concentration of about 50%.

5. The method of color stabilizing petroleum distillates which consists in passing the distillate vapors through clay to the extent of more than 1500 barrels of oil per ton of clay and treating such oil with sulfuric acid of a concentration below 70%.

6. The method of color stabilizing petroleum distillates which consists in passing the distillate vapors through clay to the extent of more than 1500 barrels of oil per ton of clay and treating such oil with sulfuric acid of a concentration of about 50%.

VANDERVEER VOORHEES.